United States Patent [19]

Zeiher et al.

[11] Patent Number: 5,256,303

[45] Date of Patent: Oct. 26, 1993

[54] METHOD FOR INHIBITING SCALE FORMATION AND/OR DISPERSING IRON IN REVERSE OSMOSIS SYSTEMS

[75] Inventors: E. H. Kelle Zeiher, Naperville; Cynthia A. Soderquist, Bolingbrook; Claudia C. Pierce, Lisle; Kenneth P. Fivizzani, Naperville, all of Ill.

[73] Assignee: Nalco Chemical Company, Naperville, Ill.

[21] Appl. No.: 916,905

[22] Filed: Jul. 20, 1992

[51] Int. Cl.$^5$ .................................................. C02F 5/14
[52] U.S. Cl. ..................................... 210/700; 210/725
[58] Field of Search ............... 210/701, 696, 697–700, 210/702, 723–725, 729, 734, 735

[56] References Cited

U.S. PATENT DOCUMENTS

| | | | |
|---|---|---|---|
| 4,499,002 | 2/1985 | Masler, III et al. | 252/180 |
| 4,563,284 | 1/1986 | Amjad | 210/699 |
| 4,566,973 | 1/1986 | Masler, III et al. | 210/701 |
| 4,566,974 | 1/1986 | Masler, III et al. | 210/701 |
| 4,652,377 | 3/1987 | Amjad | 210/699 |
| 4,744,949 | 5/1988 | Hoots et al. | 422/15 |
| 4,752,443 | 6/1988 | Hoots et al. | 422/13 |
| 4,756,881 | 7/1988 | Hoots et al. | 422/13 |
| 4,762,621 | 8/1988 | Masler, III et al. | 210/701 |
| 4,784,774 | 11/1988 | Amjad et al. | 210/699 |
| 4,898,686 | 2/1990 | Johnson et al. | 252/389.2 |
| 4,904,413 | 2/1990 | Hoots et al. | 252/389.23 |
| 4,929,425 | 5/1990 | Hoots et al. | 422/13 |
| 4,952,326 | 8/1990 | Amjad et al. | 210/701 |
| 4,952,327 | 8/1990 | Amjad et al. | 210/701 |
| 5,000,856 | 3/1991 | Chen et al. | 210/701 |

*Primary Examiner*—Frank Sever
*Attorney, Agent, or Firm*—Ohlandt, Greeley & Ruggiero

[57] ABSTRACT

A method for inhibiting calcium sulfate scale formation and deposition and/or dispersing iron from a feedstream passing through a reverse osmosis system which comprises the steps of: controlling the pH of the feedstream within the range between about 6.0 to about 7.0; controlling the temperature of the feedstream within the range between about 50° to about 80° F.; and adding a scale inhibitor and/or iron disperant to the feedstream in an amount between about 0.002 ppm per ppm hardness (as $CaCO_3$) of the feedstream to about 0.005 ppm per ppm hardness (as $CaCO_3$) of the feedstream, the scale inhibitor comprising a water-soluble organic phosphonate and an N-substituted acrylamide polymer containing an amide structure as follows:

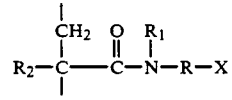

where $R_2$ is hydrogen or methyl, $R_1$ is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 2:1; provided that when X is sulfonated then R—X— is selected from the group consisting of sulfomethyl and 2-sulfoethyl.

16 Claims, 1 Drawing Sheet

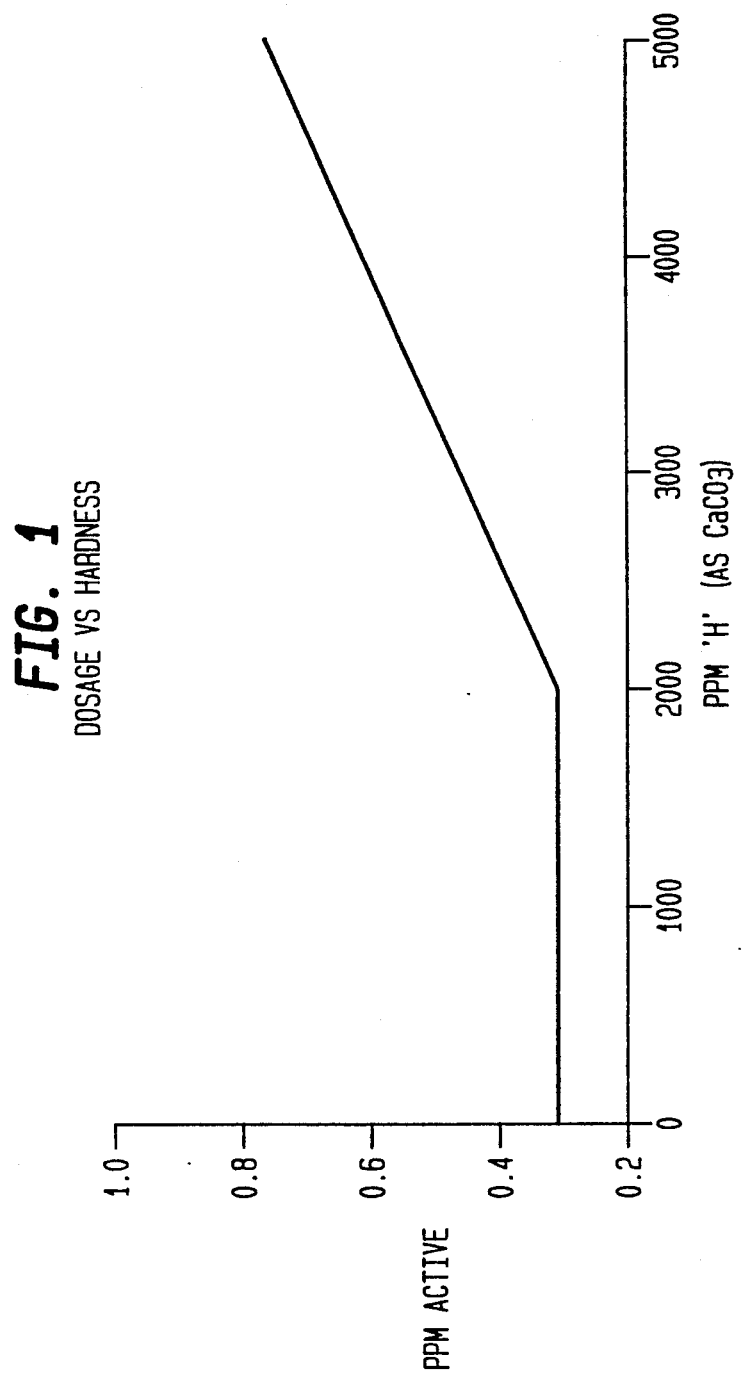

METHOD FOR INHIBITING SCALE FORMATION AND/OR DISPERSING IRON IN REVERSE OSMOSIS SYSTEMS

A method for inhibiting calcium sulfate scale formation and deposition and/or dispersing iron from a feedstream passing through a reverse osmosis system which comprises the steps of: controlling the pH of the feedstream; controlling the temperature of the feedstream; and adding a scale inhibitor and/or iron dispersant which comprises an acrylic acid/acrylamide/acrylamidomethylsulphonic acid terpolymer, a 2-phosphonobutane-1,2,4-tricarboxylic acid (PBTC) and a 1-hydroxyethylene-1,1-diphosphonic acid (HEDP) to the feedstream.

BACKGROUND OF THE INVENTION

Purification of water by reverse osmosis (RO) is growing in popularity. Specifically, it is used for seawater desalination, potable water, cooling tower make-up, process water generation, boiler feedwater pretreatment and the like. It offers the advantages of removing both organic and inorganic contaminants to yield water which is up to 98% pure. If ion exchange polishing is used downstream of the RO unit, it also saves money by reducing the frequency of demineralizer regenerations and their associated waste disposal costs.

The RO process consists of using pressure to drive water through a semipermeable membrane. As the pure water passes through the salt rejecting layer of the membrane, the remaining water is enriched in contaminants. A turbulence promoter, present within the membrane module, helps prevent the formation of large concentration gradients within the unit. Nevertheless, next to the barrier layer, an area of concentration polarization develops, and the concentrations of common scale forming salts such as $CaCO_3$ and $CaSO_4$ often exceed their solubility limits and precipitate on the surface. In addition, the presence of insoluble iron fines may also foul the membrane surface. Such scaling and fouling decreases the production of pure water. To regain the product water flow, higher driving pressures are necessary, which result in increased energy costs and potential damage to the membranes.

A significant operating cost factor of a RO system is the cost of the membranes themselves. With proper care membranes can last for years before replacement becomes necessary. If the membranes experience fouling by deposits of material on their surface, this may result in increased energy consumption, or membrane failure which would ultimately cause an unscheduled shutdown and significant replacement costs. Most RO systems incorporate some type of pretreatment system consisting of filters to remove suspended matter which minimizes fouling. Also, chemical addition is often required to inhibit scaling. Foulants are softer, noncrystalline deposits, which adhere to the membrane surface and include: colloids, small particles, oil, biological growth, metal oxides, and silica. Mineral scales are hard, dense crystalline precipitates which include, but are not limited to, $CaCO_3$, $CaSO_4$, $BaSO_4$, $SrSO_4$, $CaF_2$, and $Mg(OH)_2$.

RO end users frequently employ chemical pretreatments such as the addition of polymeric scale inhibitors/dispersants to inhibit undesirable mineral scaling. In some cases, inorganic inhibitors such as sodium hexametaphosphate (SHMP) are used.

There are many types of scale inhibitors which have been used. For example U.S. Pat. No. 4,563,284 (Amjad), issued Jan. 7, 1986, discloses a method for inhibiting formation and deposition of scale-forming salts by adding thereto an effective threshold amount of a phosphonocarboxylic acid and a telomeric phosphinocarboxylic acid that contains features of both phosphonates and polyacrylates. U.S. Pat. No. 4,762,621 (Masler, III et al.), issued Aug. 9, 1988, discloses a scale inhibitor comprising a copolymer of an acrylic acid and a lower alkyl ester of itaconic acid. U.S. Pat. No. 4,784,774 (Amjad et al.), issued Nov. 15, 1988, discloses a scale inhibitor containing a homopolymer of maleic acid or a copolymer of a monounsaturated monoοarboxylic or dioarboxylic acid or salt thereof containing 3 to 5 carbon atoms and a phosphonoalkane carboxylic acid. U.S. Pat. No. 4,952,327 (Amjad et al.), issued Aug. 28, 1990, discloses a scale inhibitor obtained by adding to an aqueous medium 0.5 to 500 ppm of a copolymer containing at least one of each of the following three monomers: (a) monounsaturated carboxylic acids as well as salts and anhydrides thereof such as acrylic acid, methacrylic acid, or maleic acid; (b) acrylamidoalkane sulfonic acids and salts thereof, such as 2-acrylamido-2-methylpropane sulfonic acid (AMPS®), a registered trademark of the Lubrizol Corporation; and (c) styrene sulfonic acid and its salts. U.S. Pat. No. 4,652,377 (Amjad), issued Mar. 24, 1987, discloses a scale inhibitor comprised of a polyacrylic acid, phytic acid, and a phosphonocarboxylic acid containing at least one phosphono group, at least two carboxylic groups, and a hydrocarbon chain of at least two carbon atoms.

The present invention is directed to the use of a terpolymer of acrylic acid/acrylamide/sulfonated acrylamide in conjunction with phosphonated products as scale inhibitors/dispersants in reverse osmosis systems. This novel antiscalant has proven particularly effective in inhibiting $CaSO_4$ scale on RO membranes. The present inventors have developed a suitable dosage profile which demonstrated effective minimum dosages of this antiscalant when used in RO systems. Also, the pH and temperature of the RO feedstream must be controlled in order to properly inhibit mineral scaling within the system.

The present invention also provides many additional advantages which shall become apparent as described below.

SUMMARY OF THE INVENTION

A method for inhibiting calcium sulfate scale formation and deposition and/or dispersing iron from a feedstream passing through a reverse osmosis system which comprises the steps of: controlling the pH of the feedstream within the range between about 6.0 to about 7.0; controlling the temperature of said feedstream within the range between about 50° to about 80° F.; and adding a scale inhibitor to the feedstream in an amount between about 0.002 ppm per ppm hardness (as $CaCO_3$) of the feedstream to about 0.005 ppm per ppm hardness (as $CaCO_3$) of the feedstream. The scale inhibitor preferably comprises at least one water-soluble organic phosphonate and an N-substituted acrylamide polymer containing an amide structure as follows:

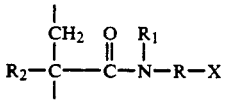

where $R_2$ is hydrogen or methyl, $R_1$ is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 2:1.

This unique polymer composition can also be used as an iron dispersant to disperse iron disposed in a feedstream passing through a reverse osmosis system. It is preferable that the iron dispersant to iron ratio be about 0.6:1 or greater.

Other and further objects, advantages and features of the present invention will be understood by reference to the following specification.

BRIEF DESCRIPTION OF THE DRAWINGS

FIG. 1 is a graph plotting dosage of a scale inhibitor (based on polymer actives) which comprises an acrylic acid/acrylamide/acrylamidomethyl-sulphonic acid terpolymer, a 2-phosphonobutane-1,2,4-tricarboxylic acid (PBTC) and a 1-hydroxyethylene-1,1-diphosphonic acid versus hardness (as $CaCO_3$) of a feedstream.

DESCRIPTION OF THE PREFERRED EMBODIMENTS

It has been found that post-polymerization derivatized hydrocarbon polymers can be used in conjunction with phosphonates to provide very effective scale inhibiting formulations for feedstreams processed in reverse osmosis systems to remove salts therefrom. Test results show these materials have synergistic effects which enhance the scale inhibition of each independent component. This scale inhibitor is also capable of dispersing iron contained within a feedwater (i.e., iron dispersancy or iron tolerance).

A preferred scale inhibitor according to the present invention comprises at least one water-soluble organic phosphonate and an N-substituted acrylamide polymer containing an amide structure. The N-substituted acrylamide polymer is preferably as follows:

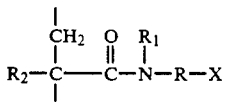

where $R_2$ is hydrogen or methyl, $R_1$ is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 2:1.

The term "phosphonate" refers to organic materials containing one or more $-PO_3H_2$ groups and salts thereof. The term "acryl" includes the term "methacryl".

One example of an N-substituted acrylamide polymer is a terpolymer of acrylic acid/acrylamide/acrylamidomethylsulfonic acid having a mole ratio of acrylic acid to acrylamide to acrylamidomethylsulphonic acid within the range between about 13-95 to about 0-73 to about 5-41, respectively; and wherein the polymer has a weight average molecular weight within the range of about 7,000 to about 82,000. More preferably, the terpolymer has a mole ratio of acrylic acid to acrylamide to acrylamidomethylsulphonic acid within the range of about 40-90 to about 0-50 to about 10-40, respectively; and wherein the polymer has a weight average molecular weight within the range of about 10,000 to about 40,000.

The preferred organic phosphonate is at least one compound selected from the group consisting of 2-phosphonobutane-1,2,4-tricarboxylic acid and 1-hydroxyethane-1,1-diphosphonic acid. One preferred combination includes both 2-phosphonobutane-1,2,4-tricarboxylic acid and 1-hydroxyethane-1,1-diphosphonic acid. The phosphonate dosage typically includes a ratio of 2-phosphonobutane-1,2,4-tricarboxylic acid to 1-hydroxyethane-1,1-diphosphonic acid within the range of about 0.5:1 to about 4:1.

The invention is also directed to a method for dispersing and maintaining dispersed particulate or inorganic matter, particularly iron oxide and clay, in an aqueous medium containing such matter and/or for controlling the deposition of scale-imparting precipitates on surfaces of equipment used in recirculating or the once-through water systems containing such precipitates, or precipitate-forming ions, under conditions which form the precipitates. This method is particularly effective for inhibiting calcium sulfate scale formation and deposition from a feedstream passing through a reverse osmosis system disposed within a plant for use in providing boiler feedwater, cooling tower make-up water, purified process water, potable water, or for use in the desalination of seawater or the like. The reverse osmosis system is capable of purifying water from brine solutions or brackish waters containing a high concentration of salts.

This method comprises the steps of: controlling the pH of the feedstream within the range between about 6.0 to about 7.0; controlling the temperature of the feedstream within the range between about 50° to about 80° F.; and adding a scale inhibitor to the feedstream. The scale inhibitor is preferably added at a minimum concentration of about 0.002 ppm per ppm hardness (as $CaCO_3$) of the feedstream. The preferred maximum concentration is about 0.005 ppm per ppm hardness (as $CaCO_3$) of the feedstream. The scale inhibitor is preferably added to the feedstream in a ratio between about 0.3:1 to about 20:1 ppm polymer actives per ppm hardness, where the appropriate dosage is actually calculated using the graph in FIG. 1. It is possible that the antiscalant may be used in amount less than 0.3 ppm polymer actives, in some cases.

The pH of the feedstream is controlled by the use of sulfuric acid in an amount such that only $CaSO_4$ is precipitated, not $CaCO_3$. The pH of the feedstream is preferably controlled within the range between about 6.0 to about 7.0, most preferably such that it does not exceed 6.5.

When iron is contained within a feedstream passing through a reverse osmosis system it can be dispersed by the steps of: controlling the pH of the feedstream within the range between about 6.0 to about 8.5; controlling the temperature of the feedstream within the range between about 30° to about 80° F.; and adding an iron dispersant to the feedstream. The iron dispersant to iron ratio is approximately 0.6:1 or greater.

THE DERIVATIZED POLYMERS

The polymers of this invention have been prepared by post-polymerization derivatization. The derivatizing agents of the invention are hydrocarbon groups containing both an amino functionality and at least one of the following groups:
1. (poly)hydroxy alkyl(aryl);
2. alkyl and aryl(poly)carboxylic acids and ester analogues;
3. aminoalky(aryl) and quaternized amine analogues;
4. halogenated alkyl(aryl);
5. (poly)ether alkyl(aryl);
6. (di)alkyl;
7. alkyl phosphonic acid;
8. alkyl keto carboxylic acid;
9. hydroxyalkyl sulfonic acid; and
10. (aryl)alkyl sulfonic acid, wherein the prefix "poly" refers to two or more such functionalities.

The derivatization process of the invention includes direct amidation of polyalkyl carboxylic acids and transamidation of copolymers containing carboxylic acid and (meth)acrylamide units.

Particularly advantageous are polymers of the present invention containing sulfomethylamide (AMS), sulfoethylamide (AES), sulfophenylamide (APS), 2-hydroxy-3-sulfopropylamide (HAPS) and 2,3-dihydroxypropylamide units which are produced by transamidation using acrylic acid (AA) or acrylamide (Am) homopolymers and copolymers, including terpolymers, which have a mole percent of acrylamide or homologous units of a minimum of about 10%. The transamidation is achieved using such reactants as aminomethanesulfonic acid, 2-aminoethanesulfonic acid (taurine, 2-AES), 4-aminobenzenesulfonic acid (p-sulfanilic acid), 1-amino-2-hydroxy-3-propanesulfonic acid, or 2,3-dihydroxypropylamine in aqueous or like polar media at temperatures on the order of about 150° C. Once initiated, the reactions go essentially to completion.

Other particularly advantageous polymeric sulfonates of the present invention are produced by an addition reaction between an aminosulfonic acid, such as sulfanilic acid, and taurine, or their sodium salts, and a copolymer of maleic anhydride and a vinylic compound such as styrene, methyl vinyl ether, or (meth)acrylamide.

THE PHOSPHONATES

Generally any water-soluble phosphonate may be used that is capable of providing scale inhibition in acidified systems. See U.S. Pat. Nos. 4,756,881 (Hoots et al.), issued Jul. 12, 1988, and 4,929,425 (Hoots et al.), issued May 29, 1990, which refer to a number of representative phosphonates. As such, the subject matter of U.S. Pat. Nos. 4,756,881 and 4,929,425 are incorporated herein by reference.

Preferred phosphonates are the two compounds: (a) 2-phosphonobutane-1,2,4-tricarboxylic acid; and (b) 1-hydroxyethane-1,1-diphosphonic acid.

Individual phosphonates may be used in combination with polymer(s) and good results have also been obtained by using a blend of phosphonates such as 2-phosphonobutane-1,2,4-tricarboxylic acid and 1-hydroxyethane-1,1-diphosphonic acid. When they are combined it is in a weight ratio of 2-phosphonobutane-1,2,4-tricarboxylic acid to 1-hydroxyethane-1,1-diphosphonic acid of from 0.5:1 to 4:1 and preferably from 0.5:1 to 2:1 and most preferably about 1.6:1.

Scale inhibitors can be used in applications other than purification of boiler feedwater, cooling tower make-up, process water, potable water and seawater desalination where calcium sulfate scaling is a major consideration. Particular applications contemplated herein are flash distillation, oil field applications, pulp digesters, phosphoric acid production, sugar evaporators, and the like.

Scale formation occurs when the concentrations of species, such as calcium and magnesium, exceed the solubility constants of their sparingly soluble salts. The factors which affect scale formation include: temperature, pH, and competitive equilibria. In order to demonstrate the effectiveness of the scale inhibitor/dispersant polymer of the present invention versus conventional antiscalant treatment programs, the present inventors have conducted the following experiments.

EXAMPLE 1

The procedure used in the following demonstration was devised to examine $CaSO_4$, $Ca_3(PO_4)_2$, and $CaCO_3$ scale formation. In general, solutions of an inhibitor (generally between 5–50 ppm) and counterion (i.e., anions such as $SO_4^{-2}$, $PO_4^{-3}$, and $CO_3^{-2}$) were prepared and adjusted with caustic to a specific pH. These solutions were equilibrated at the specified temperature and pH for 45 minutes. After the conditioning period, the calcium solution (i.e., a solution of $CaCl_2.2H_2O$) was added. This final solution was maintained at the specified temperature and pH for 20 hours. The pH was controlled by automatic addition of 0.1N NaOH with a peristaltic pump controlled by a pH controller.

The antiscalant screening assembly used in this experiment consisted of a temperature controlled bath equipped with a magnetic stirring device. Each of the cells in the bath was equipped with a stir bar, a NaOH feed tube, and a pH electrode interfaced to the NaOH feed via a pH controller. Each cell was covered to minimize evaporation. Samples were withdrawn at Time=0 and 20 hours, filtered through $0.22\mu$ filters and analyzed for calcium using an EDTA/Calmagite ® titration or, in the case of $Ca_3(PO_4)_2$, analyzed for $PO_4$ using an accepted colorimetric method. For comparative purposes, the ability to inhibit scale formation and deposition is expressed as % Inhibition (% I) which is calculated by the following formula:

$$\% \text{ Inhibition} = \left( \frac{(\text{Ion})\text{exp} - (\text{Ion})\text{Blank Final}}{(\text{Ion})\text{initial} - (\text{Ion})\text{Blank Final}} \right) \times 100$$

where, (Ion)exp is the concentration of ion in the filtrate in the presence of polymer at Time (t), (Ion)Blank Final is the concentration of ion in the filtrate of the blank at Time (t), and (Ion)initial is the initial concentration of ion at Time zero.

Initial screening revealed that the antiscalant candidates chosen for testing showed more promise as $CaSO_4$ scale inhibitors than as $Ca_3(PO_4)_2$ or $CaCO_3$ inhibitors. The products tested included Sample 1 (a terpolymer of acrylic acid/acrylamide/a-crylamidomethylsulphonic acid (50:30:20) with HEDP and PBTC), Sample 2 (a terpolymer of acrylic acid/methacrylic acid/t-butyl acrylamide (60:20:20) with HEDP and PBTC), Sample 3 (a 2-propenoic acid, polymer with sodium phosphinate), Sample 4 (HEDP), Sample 5 (PBTC), Sample 6 (a terpolymer of acrylic acid/methacrylic acid/t-butyl acrylamide (60:20:20)), Sample 7 (a terpolymer of acrylic acid/acrylamide/acrylamido-methylsulfonic acid (50:30:20)), Sample 8 (aminotri(methylenephonsphonic acid)), Sample 9 ([hexamethylenebis(nitrilodimethylene)]-tetraphosphonic acid, hexapotassium salt), Sample 10 (sodium hexametaphosphate (SHMP)), and Sample 11 (a polyacrylate).

The results of these experiments are set forth in the Tables herebelow.

TABLE 1

(Inhibitor Performance)
Conditions: 5000 ppm Ca (as CaCO$_3$), 4800 ppm SO4 (as CaCO$_3$), 50° C., pH 8.5, 20 hours

| Sample No. | PPM Actives | % I | Average | Standard Deviation | N |
|---|---|---|---|---|---|
| 1 | 0.38 | 18 | | | 1 |
| 1 | 0.61 | 15 | | | |
| 1 | 0.61 | 16 | 15.4 | ±0.9 | 2 |
| 1 | 0.68 | 18 | | | |
| 1 | 0.68 | 16 | 17.3 | ±1.3 | 2 |
| 1 | 0.76 | 101 | | | |
| 1 | 0.76 | 100 | | | |
| 1 | 0.76 | 96 | | | |
| 1 | 0.76 | 89 | | | |
| 1 | 0.76 | 100 | | | |
| 1 | 0.76 | 104 | 99.9 | ±4.0 | 12 |
| 1 | 0.76 | 100 | | | |
| 1 | 0.76 | 101 | | | |
| 1 | 0.76 | 100 | | | |
| 1 | 0.76 | 104 | | | |
| 1 | 0.76 | 102 | | | |
| 1 | 0.76 | 102 | | | |
| 1 | 0.91 | 103 | | | |
| 1 | 0.91 | 103 | 103.0 | ±0.0 | 2 |
| 1 | 1.14 | 97 | | | |
| 1 | 1.14 | 99 | | | |
| 1 | 1.14 | 97 | | | |
| 1 | 1.14 | 103 | | | |
| 1 | 1.14 | 99 | 95.8 | ±9.2 | 9 |
| 1 | 1.14 | 95 | | | |
| 1 | 1.14 | 101 | | | |
| 1 | 1.14 | 100 | | | |
| 1 | 1.14 | 72 | | | |
| 1 | 1.51 | 83 | | | 1 |
| 1 | 2.27 | 101 | | | |
| 1 | 2.27 | 98 | 100.4 | ±2.0 | 3 |
| 1 | 2.27 | 102 | | | |
| 1 | 3.03 | 102 | | | |
| 1 | 3.03 | 88 | 96.2 | ±7.5 | 3 |
| 1 | 3.03 | 99 | | | |
| 1 | 4.01 | 97 | | | |
| 1 | 4.01 | 103 | 99.7 | ±4.2 | 2 |
| 2 | 0.38 | 13 | | | |
| 2 | 0.38 | 12 | | | |
| 2 | 0.38 | 13 | | | |
| 2 | 0.38 | 15 | 13.8 | ±1.5 | 6 |
| 2 | 0.38 | 16 | | | |
| 2 | 0.38 | 13 | | | |
| 2 | 0.76 | 101 | | | |
| 2 | 0.76 | 103 | | | |
| 2 | 0.76 | 99 | 97.8 | ±6.8 | 4 |
| 2 | 0.76 | 88 | | | |
| 2 | 1.14 | 97 | | | |
| 2 | 1.14 | 92 | 95.2 | ±2.7 | 3 |
| 2 | 1.14 | 96 | | | |
| 3 | 1.05 | 15 | | | |
| 3 | 1.05 | 16 | 14.6 | ±1.7 | 3 |
| 3 | 1.05 | 13 | | | |
| 3 | 1.40 | 101 | | | |
| 3 | 1.40 | 99 | 99.4 | ±1.3 | 3 |
| 3 | 1.40 | 98 | | | |
| 3 | 1.75 | 101 | | | |
| 3 | 1.75 | 101 | 101.0 | ±0.0 | 2 |
| 3 | 3.50 | 101 | | | |
| 3 | 5.25 | 101 | | | |
| 3 | 5.25 | 101 | 101.0 | ±0.0 | 2 |

TABLE 1-continued (Inhibitor Performance)
Conditions: 5000 ppm Ca (as CaCO$_3$), 4800 ppm SO4 (as CaCO$_3$), 50° C., pH 8.5, 20 hours

| Sample No. | PPM Actives | % I | Average | Standard Deviation | N |
|---|---|---|---|---|---|
| 4 | 0.56 | 13 | | | |
| 4 | 0.56 | 10 | 11.4 | ±2.2 | 2 |
| 4 | 0.76 | 30 | | | |
| 4 | 0.76 | 15 | 22.9 | ±10.6 | 2 |
| 5 | 0.90 | 11 | | | |
| 5 | 0.90 | 10 | 10.2 | ±0.5 | 2 |
| 5 | 1.20 | 10 | 10 | — | 1 |
| 6 | 0.38 | 22 | | | |
| 6 | 0.38 | 11 | 15.0 | ±6.3 | 3 |
| 6 | 0.38 | 12 | | | |
| 6 | 0.76 | 22 | | | |
| 6 | 0.76 | 25 | | | |
| 6 | 0.76 | 24 | 21.6 | ±4.2 | 4 |
| 6 | 0.76 | 16 | | | |
| 6 | 1.14 | 14 | | | |
| 6 | 1.14 | 14 | 13.6 | ±0.8 | 3 |
| 6 | 1.14 | 13 | | | |
| 6 | 4.00 | 99 | 99 | — | 1 |
| 6 | 10.00 | 100 | 100 | — | 1 |
| 7 | 1.14 | 11 | | | |
| 7 | 1.14 | 11 | 10.6 | ±0.8 | 3 |
| 7 | 1.14 | 10 | | | |
| 7 | 4.00 | 97 | 97.0 | — | 1 |
| 7 | 10.00 | 95 | 95.0 | — | 1 |
| 8 | 0.60 | 10 | 10 | — | 1 |
| 8 | 0.90 | 17 | | | |
| 8 | 0.90 | 23 | 19.5 | ±3.3 | 3 |
| 8 | 0.90 | 18 | | | |
| 9 | 0.60 | 10 | | | |
| 9 | 0.60 | 12 | 10.7 | ±1.5 | 2 |
| 9 | 0.90 | 101 | | | |
| 9 | 0.90 | 102 | 102.0 | ±1.0 | 3 |
| 9 | 0.90 | 103 | | | |
| 10 | 0.50 | 17 | | | |
| 10 | 0.50 | 15 | 16.1 | ±1.6 | 2 |
| 10 | 1.00 | 15 | 15 | — | 1 |
| 10 | 2.00 | 16 | 16 | — | 1 |
| 10 | 5.00 | 18 | | | |
| 10 | 5.00 | 17 | 17.1 | ±0.6 | 2 |
| 10 | 10.00 | 18 | | | |
| 10 | 10.00 | 17 | 17.2 | ±0.6 | 2 |
| 11 | 0.38 | 10 | 10 | — | 1 |
| 11 | 0.76 | 15 | | | |
| 11 | 0.76 | 15 | 15.0 | ±0 | 3 |
| 11 | 0.76 | 15 | | | |
| 11 | 1.14 | 15 | | | |
| 11 | 1.14 | 14 | 16.3 | ±3.7 | 3 |
| 11 | 1.14 | 20 | | | |
| 6/4 | 1.14/0.56 | 54 | | | 1 |
| 6/5 | 1.14/0.30 | 95 | | | |
| 6/5 | 1.14/0.30 | 60 | | | |
| 6/5 | 1.14/0.30 | 14 | | | |
| 6/5 | 1.14/0.30 | 93 | 64.8 | ±38.4 | 6 |
| 6/5 | 1.14/0.30 | 102 | | | |
| 6/5 | 1.14/0.30 | 24 | | | |
| 7/4 | 1.14/0.56 | 9 | | | |
| 7/4 | 1.14/0.56 | 14 | 12.9 | ±3.2 | 3 |
| 7/4 | 1.14/0.56 | 16 | | | |
| 7/5 | 0.76/0.30 | 10 | | | 1 |
| 7/5 | 0.76/0.60 | 12 | | | |
| 7/5 | 0.76/0.60 | 105 | 58.3 | ±65.7 | 2 |
| 7/5 | 0.76/0.90 | 98 | | | 1 |
| 7/5 | 0.76/1.20 | 98 | | | 1 |
| 7/5 | 1.14/0.30 | 93 | | | |
| 7/5 | 1.14/0.30 | 96 | | | |
| 7/5 | 1.14/0.30 | 13 | | | |
| 7/5 | 1.14/0.30 | 17 | 70.5 | ±43.1 | 6 |
| 7/5 | 1.14/0.30 | 103 | | | |
| 7/5 | 1.14/0.30 | 100 | | | |
| 7/5 | 1.14/0.60 | 99 | | | 1 |
| 11/5 | 0.76/0.60 | 92 | | | 1 |
| 11/5 | 0.76/1.20 | 92 | | | 1 |
| 11/5 | 1.14/0.30 | 97 | | | 1 |
| 11/5 | 1.14/0.60 | 90 | | | 1 |

A typical dosage profile for an antiscalant comprising a terpolymer of acrylic acid/acrylamide/acrylamidomethylsulphonic acid (50:30:20), HEDP, and PBTC (sample 1) when used to inhibit $CaSO_4$ is set forth in Table 2 below:

TABLE 2

($CaSO_4$ Dosage Profile)
Conditions: 5000 ppm Ca (as $CaCO_3$), 4800 ppm SO4 (as $CaCO_3$) 50° C., pH 8.5, 20 hours

| Sample No. | PPM Actives | % I | Average | Standard Deviation | N |
|---|---|---|---|---|---|
| 1 | 0.61 | 15 | | | |
| 1 | 0.61 | 16 | 15.4 | ±0.9 | 2 |
| 1 | 0.68 | 18 | | | |
| 1 | 0.68 | 16 | 17.3 | ±1.3 | 2 |
| 1 | 0.76 | 101 | | | |
| 1 | 0.76 | 100 | | | |
| 1 | 0.76 | 96 | | | |
| 1 | 0.76 | 89 | | | |
| 1 | 0.76 | 100 | | | |
| 1 | 0.76 | 104 | 99.9 | ±3.9 | 12 |
| 1 | 0.76 | 100 | | | |
| 1 | 0.76 | 101 | | | |
| 1 | 0.76 | 100 | | | |
| 1 | 0.76 | 104 | | | |
| 1 | 0.76 | 102 | | | |
| 1 | 0.76 | 102 | | | |
| 1 | 0.91 | 103 | | | |
| 1 | 0.91 | 103 | 103.0 | ±0.0 | 2 |

In summary, the data set forth in Table 1 and 2 above demonstrates that, inter alia, the terpolymer of acrylic acid/acrylamide/acrylamidomethylsulphonic acid (Sample 7) was capable of inhibiting $CaSO_4$ scale at high polymer concentrations, as was the terpolymer of acrylic acid/methacrylic acid/t-butyl acrylamide (Sample 6). That is, 4 and 10 ppm active gave 97–100% inhibition. At 0.76 ppm active polymer, however, both polymers showed only 15–22% inhibition. Similar results were obtained with the polyacrylate (Sample 11) at 0.76 ppm active (i.e., 15% inhibition).

In another application HEDP (Sample 4) and PBTC (Sample 5) were added to Samples 1 and 2 as corrosion inhibitors. Both were tested for their ability to inhibit $CaSO_4$ scale. At dosages of 0.56 and 0.74 ppm actives, HEDP was a poor inhibitor (<13%). Similarly, PBTC at 0.9 and 1.2 ppm active was also a poor inhibitor (<11%). Aminotri(methylenephosphonic acid (Sample 8) was ineffective as a scale inhibitor at 0.6 and 0.9 ppm active (<20%). The [hexamethylenebis(nitrilodimethylene)]-tetraphosphonic acid, hexapotassium salt (Sample 9) was also ineffective at 0.6 ppm active (<11%). SHMP (Sample 10), commonly used in desalination applications as a scale inhibitor, showed poor $CaSO_4$ inhibition (i.e., ≦17% inhibition at dosages between 0.5 and 2.0 ppm actives).

The combination of the terpolymer acrylic acid/acrylamide/acrylamidomethylsulphonic acid (Sample 7) and HEDP (Sample 4) at 1.14/0.56 ppm active, respectively, showed an average inhibition of 12 9%. Combinations of the terpolymer acrylic acid/acrylamide/acrylamidomethylsulphonic acid (Sample 7) and PBTC (Sample 5) gave a range of inhibition values. Dosages of Sample 5 as low as 0.3 ppm active gave acceptable inhibition, provided they were combined with sufficient polymer (i.e., 1.14 ppm active, minimum). There was a large standard deviation for these combinations, however, suggesting it was the threshold dosage. Combinations based on lower polymer dosages (i.e., 0.76 ppm active) and higher phosphonate dosages (i.e., 0.6 ppm active) were also promising. Comparable results were achieved with the combination of Samples 6 and 5.

The antiscalant of the present invention, i.e., a terpolymer of acrylic acid/acrylamide/acrylamidomethylsulphonic acid, PBTC and HEDP (Sample 1), showed good inhibition (i.e., >95%) at greater than or equal to 0.76 ppm active polymer. At 0.38 ppm active polymer, poor inhibition (i.e., <20%) was achieved. Similar results were obtained with a terpolymer of acrylic acid/methacrylic acid/t-butyl acrylamide, PBTC, and HEDP (Sample 2). 2-propenoic acid polymer with sodium phosphinate (Sample 3) exhibited good inhibition (≧98%) at 1.4 ppm active polymer and higher. At 1.05 ppm active polymer, less than 15% inhibition was achieved.

The novel antiscalant of the present invention (Sample 1) is an effective antiscalant which yields greater than 95% inhibition of calcium sulfate scale under the current test conditions when dosed at 0.76 active polymer.

EXAMPLE 2

Well water having a total hardness of 3724 ppm (as $CaCO_3$) was passed through a general media filter, a greensand filter, and a 5 micron cartridge filter before feeding to membrane skids. Each skid contained two membranes. One membrane received a feedwater stream treated with the antiscalant of the present invention, i.e., a terpolymer of acrylic acid/acrylamide/acrylamidomethylsulphonic acid, PBTC and HEDP, and the other received an untreated stream. Sample collection points were set up for feedwater, product and reject. The skids were fitted with 2.5"×14" spiral wound brackish water membrane elements at the start of the test. Before treatment feed began, both membranes were run for 1 day to establish baseline parameters for them and to ensure that they were not defective.

Two types of tests were done. First, membrane compatibility tests were performed on thin film composite membranes, i.e., an FT30 membrane sold by Filmtec Corporation and a CPA2 membrane sold by Hydranautics. The treated membranes were each initially fed 4.56 ppm active polymer. Recoveries for the skids were set at 10%. The systems ran for 6 weeks during which water samples were collected daily. In addition, the pressures, conductivities, flows, temperatures and pH's were recorded daily, and the recovery and rejection data were calculated from them.

Second, the recoveries on both skids were increased to 30% to stress the systems and determine product performance under more stringent conditions. After this test, the membranes were removed and cut in half. One half was analyzed for microbial contamination, and the second half was placed in a preservative solution (i.e., 1% sodium bisulfite) and retained for future analyses.

In the analysis of membrane performance, two parameters are critical. The first is the permeate (product) flow rate and the second is the membrane's salt rejection. In general, permeate flow rates will decrease as the membrane becomes fouled or scaled. Furthermore, if the membrane becomes damaged, the salt passage may increase (i.e., salt rejection decreases). The percent salt rejection is given by the formula:

% Rejection = [1−(P/F)]×100 where P is the concentration of ion in permeate and F is the concentration of ion in feed.

The percent flow loss for the treated CPA2 membrane was 15.8%, compared to 80% loss for the untreated CPA2 membrane. The percent salt rejection for the treated CPA2 membrane was 96.3% and 96.1% for the untreated membrane.

For the treated FT30 membrane, the percent flow loss was 15.7% based on the raw data and 19.7% based on the normalized data. This can be compared to the 10 percent flow loss in the blank which was 86% for the raw data and 89% for the normalized data. Therefore, the antiscalant of the present invention exhibited good scale inhibition.

mined. Results were reported as ppm Fe or % Fe dispersed.

The following samples were tested for scale inhibition and iron dispersancy: a mixture containing a terpolymer of acrylic acid/methacrylic acid/t-butyl acrylamide (60:20:20), HEDP and PBTC (Sample 1); the scale inhibitor of the present invention which is a mixture comprising a terpolymer of acrylic acid/acrylamide/acrylamidomethylsulphonic acid, HEDP and PBTC (Sample 2); a polymeric phosphinocarboxylic acid (Sample 3); a polymaleic acid antiscalant (Sample 4); and a blank control product (Sample 5). The antiscalant activity and iron dispersancy of the above samples are set forth below in Table 3.

TABLE 3

| Sample No. | % CaSO4 Dispersed (5 ppm Fe) (5 ppm Active Polymer) | % CaSO4 Dispersed (10 ppm Fe) (5 ppm Active Polymer) | ppm Fe Dispersed (10 ppm Active Polymer) | % Fe Dispersed (10 ppm Active Polymer) |
|---|---|---|---|---|
| 1 | Not Tested | 100% | 10 | 100% |
| 2 | 100% | 100% | 10 | 100% |
| 3 | Not Tested | 100% | 0 | 0% |
| 4 | Not Tested | 100% | 0 | 0% |
| 5 | 0% | 0% | 0 | 0% |

Similar tests were also run with dosages as low as 0.3 ppm active polymer. Scanning electron microscopy (SEM) analysis of membrane samples from each test revealed scale and/or iron deposits on the untreated membranes but not on the treated membranes.

EXAMPLE 3

Two types of test were done to analyze scale inhibitor response to iron. The first tested scale inhibitor's antiscalant activity in the presence of added iron. It can be used to determine a scale inhibitor's resistance to iron poisoning. The second tested the scale inhibitor's iron dispersancy.

The procedure for determining scale inhibition in the presence of iron involved the combining of a dose of scale inhibitor and an anion solution, adjusting of the pH and temperature (i.e., usually to a pH of 8.5 and a temperature of 50° C.), and equilibrated via stirring for 45 minutes. A calcium solution was then added and conditions were maintained for 20 hours. Results were reported as percent inhibition (% Inhibition) according to the formula set forth above in Example 1.

The composition of the test water is given below for two sets of conditions, i.e., standard and extreme.

| SPECIES | STANDARD | EXTREME |
|---|---|---|
| Ca | 410 ppm | 820 ppm |
| Mg | 280 ppm | 560 ppm |
| SiO2 | 50 ppm | 50 ppm |
| SO4 | 500 ppm | 1000 ppm |
| Total 'H' (as CaCO3) | 2176 ppm | 4352 ppm |
| pH | 7.0 | 8.5 |
| Temperature | 30–50° C. | 50° C. |

Treatments were tested at 5 ppm scale inhibitor, with 5 and 10 ppm of FeSO4 (i.e., soluble Fe$^{+2}$) added.

The iron dispersancy test involved placing a solution (250 ml) containing 360 ppm Ca (CaCO3), 200 ppm Mg (CaCO3), 10 ppm polymer actives, and 10 ppm soluble Fe$^{+2}$ in a 500 ml graduated cylinder. After adjustment to pH 8.5, it was heated to 60° C. for 2 hours with minimal stirring. After settling for 24 hours at room temperature, the iron content of the supernatant was deter- All the products tested for scale inhibition in the presence of iron maintained 100% inhibition up to 10 ppm added iron. Note that due to hydrolysis at this pH, the iron is insoluble Fe (III), even though it was added to the system as Fe(II). In addition to the results reported above, Sample 4 and Sample 2 were tested with up to 40 ppm added iron. Both exhibited 100% CaSO4 dispersion under these conditions as well.

Also shown in Table 3 are the results of the iron disperancy test. Samples 1 and 2 exhibited 100% iron dispersancy. The solutions in both cases were a nearly clear yellow. Samples 3, 4 and 5 did not disperse iron. The solutions from these tests were colorless, with a thick iron precipitate on the bottom of the cylinders.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for inhibiting calcium sulfate scale formation and deposition from a feedstream passing through a reverse osmosis system which comprises the steps of:

a. controlling the pH of said feedstream within the range between about 6.0 to about 7.0;

b. controlling the temperature of said feedstream within the range between about 50° to about 80° F.; and c. adding a scale inhibitor to said feedstream in an amount between about 0.002 ppm per ppm hardness (as CaCo3) of said feedstream to about 0.005 ppm per ppm hardness (as CaCO3) of said feedstream, said scale inhibitor comprising a water-soluble organic phosphonate which comprises a 2-phosphonobutane-1,2,4-tricarboxylic acid and a 1-hydroxyethane-1,1-diphosphonic acid, and an N-substituted acrylamide polymer containing an amide structure as follows:

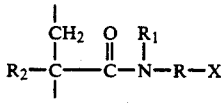

where $R_2$ is hydrogen or methyl, $R_1$ is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 2:1.

2. The method according to claim 1 wherein said N-substituted acrylamide polymer is an acrylic acid/acrylamide/acrylamidomethylsulphonic acid polymer having a mole ratio of acrylic acid to acrylamide to acrylamidomethylsulphonic acid within the range between about 13–95 to about 0–73 to about 5–41, respectively; and wherein the polymer has a weight average molecular weight within the range of about 7,000 to about 82,000.

3. The method according to claim 2 wherein said polymer has a mole ratio of acrylic acid to acrylamide to acrylamidomethylsulphonic acid within the range of about 40–90 to about 0–50 to about 10–40, respectively; and wherein said polymer has a weight average molecular weight within the range of about 10,000 to about 40,000.

4. The method according to claim 3 wherein said polymer has a mole ratio of acrylic acid to acrylamide to acrylamidomethylsulphonic acid of 50:30:20.

5. The method according to claim 1 wherein the phosphonate dosage includes a ratio of 2-phosphonobutane-1,2,4-tricarboxylic acid to 1-hydroxyethane-1,1-diphosphonic acid within the range of about 0.5:1 to about 4:1.

6. The method according to claim 1 wherein the pH of the feedstream is controlled by the use of sulfuric acid in an amount such that only $CaSO_4$ is precipitated, not $CaCO_3$.

7. The method according to claim 1 wherein said scale inhibitor is added to said feedstream in a ratio between about 0.3:1 to about 20:1 ppm polymer actives per ppm hardness (as $CaCO_3$).

8. The method according to claim 1 wherein the pH of the feedstream is not greater than 6.5.

9. A method for dispersing iron disposed in a feedstream passing through a reverse osmosis system which comprises the steps of:
a. controlling the pH of said feedstream within the range between about 6.0 to about 8.5;
b. controlling the temperature of said feedstream within the range between about 30° to about 80° F.; and
c. adding an iron dispersant to said feedstream, said iron dispersant comprising a water-soluble organic phosphonate which comprises a 2-phosphonobutane-1,2,4-tricarboxylic acid and a 1-hydroxyethane-1,1-diphosphonic acid, and an N-substituted acrylamide polymer containing an amide structure as follows:

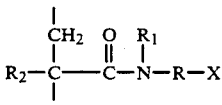

where $R_2$ is hydrogen or methyl, $R_1$ is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 2:1.

10. The method according to claim 9 wherein said N-substituted acrylamide polymer is an acrylic acid/acrylamide/acrylamidomethylsulphonic acid polymer having a mole ratio of acrylic acid to acrylamide to acrylamidomethylsulphonic acid within the range between about 13–95 to about 0–73 to about 5–41, respectively; and wherein the polymer has a weight average molecular weight within the range of about 7,000 to about 82,000.

11. The method according to claim 10 wherein said polymer has a mole ratio of acrylic acid to acrylamide to acrylamidomethylsulphonic acid within the range of about 40–90 to about 0–50 to about 10–40, respectively; and wherein said polymer has a weight average molecular weight within the range of about 10,000 to about 40,000.

12. The method according to claim 11 wherein said polymer has a mole ratio of acrylic acid to acrylamide to acrylamidomethylsulphonic acid of 50:30:20.

13. The method according to claim 9 wherein the phosphonate dosage includes a ratio of 2-phosphonobutane-1,2,4-tricarboxylic acid to 1-hydroxyethane-1,1-diphosphonic acid within the range of about 0.5:1 to about 4:1.

14. The method according to claim 9 wherein said iron dispersant is added to the feedstream in a ratio of dispersant to iron of about 0.6:1 or greater.

15. A method for inhibiting calcium sulfate scale formation and for dispersing iron from a feedstream passing through a reverse osmosis system which comprises the steps of:
a. controlling the pH of said feedstream within the range between about 6.0 to about 7.0;
b. controlling the temperature of said feedstream within the range between about 50° to about 80° F.; and
c. adding a product polymer capable of both inhibiting scale formation/deposition and dispersing iron to said feedstream in an amount between about 0.002 ppm per ppm hardness (as $CaCO_3$) of said feedstream to about 0.005 ppm per ppm hardness (as $CaCO_3$) of said feedstream, said product polymer comprising a water-soluble organic phosphonate which comprises a 2-phosphonobutane-1,2,4-tricarboxylic acid and a 1-hydroxyethane-1,1-diphosphonic acid, and an N-substituted acrylamide polymer containing an amide structure as follows:

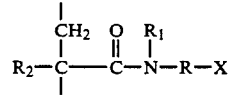

where $R_2$ is hydrogen or methyl, $R_1$ is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 2:1.

16. The method according to claim 17 wherein said product polymer is added to the feedstream in a ratio of product polymer to iron of about 0.6:1 or greater.

* * * * *